US005847262A

United States Patent [19]

Ito et al.

[11] Patent Number: 5,847,262

[45] Date of Patent: Dec. 8, 1998

[54] IMPACT DETECTING APPARATUS

[75] Inventors: Koji Ito, Aichi; Toshiro Maeda, Chiryu; Soichiro Masuda, Toyota; Kazuya Tanaka, Nagoya, all of Japan

[73] Assignee: Aisin Seiki Kabushiki Kaisha, Aichi, Japan

[21] Appl. No.: 919,518

[22] Filed: Aug. 28, 1997

[30] Foreign Application Priority Data

| | | | |
|---|---|---|---|
| Aug. 29, 1996 | [JP] | Japan | 8-228993 |
| Aug. 7, 1997 | [JP] | Japan | 9-213060 |

[51] Int. Cl.⁶ .......................... G01P 15/135; H01H 35/14

[52] U.S. Cl. ............... 73/11.01; 73/514.16; 200/61.45 R

[58] Field of Search ............................. 73/514.16, 11.01, 73/862.381; 200/61.45 R; 280/734

[56] References Cited

U.S. PATENT DOCUMENTS

| | | | |
|---|---|---|---|
| 2,415,086 | 2/1947 | Detwiler | 200/61.45 R X |
| 4,178,492 | 12/1979 | Roesch et al. | 200/61.45 R |
| 4,326,111 | 4/1982 | Jackman | 200/61.45 R |
| 4,533,801 | 8/1985 | Jackman et al. | 200/61.45 R |
| 4,618,746 | 10/1986 | Schwob et al. | 200/61.45 R |

FOREIGN PATENT DOCUMENTS

| | | | |
|---|---|---|---|
| 58-502120 | 12/1983 | Japan | 200/61.45 R |
| 1-42095 | 9/1989 | Japan | 200/61.45 R |

*Primary Examiner*—Daniel S. Larkin
*Attorney, Agent, or Firm*—Hazel & Thomas, PC

[57] ABSTRACT

An impact detecting apparatus has a housing having a conical slope therein and a ball located on the conical slope. A shaft is located within the housing and movably supported on the housing for striking the ball with one end. A fixed electrode is located within the housing and a movable electrode is located near the fixed electrode. The movable electrode electrically connects with the fixed electrode. A lever is rotatably and slidably supported within the housing. One end of the lever is able to push the movable electrode and the other end of the lever is able to contact with the shaft. A spring urges the shaft for striking the ball.

6 Claims, 11 Drawing Sheets

IMPACT DETECTING APPARATUS

FIELD OF THE INVENTION

The present invention relates to an impact detecting apparatus and, in particular, to an apparatus which detects an impact for a safety system of a vehicle such as a fuel cutting device, an air bag or a tensioner of a seat belt.

BACKGROUND OF THE INVENTION

A conventional impact detecting apparatus of this kind known in the art is as disclosed in the specification of Japanese Patent Application Laid-Open Number 58-502120 and Japanese Patent Application Number 1-42095.

In the former document, the impact detecting apparatus includes a housing having a conical slope therein, a ball located on the conical slope, a pair of fixed electrodes which are made of elastic material, a movable conductor which is located between the fixed electrodes and which is positioned between the fixed electrodes so as to connect the electric power. The movable conducter is able to be bent by an external force so that the electric power is disconnected. In this apparatus, when an impact greater than the predetermined value is applied, the ball is moved on the conical slope and bumps into the movable conductor so as to bend the movable conductor. When the electric power is disconnected, the impact detecting apparatus outputs an impact signal.

In the latter document, the impact detecting apparatus includes a housing having a conical slope therein, a ball located on the conical slope, three fixed electrodes which are an input electrode and two output electrodes, a load member which is supported by the input electrode and is able to be contacted with the ball, a movable conductor which is supported by the input electrode and supports the load member and which is able to contact the output electrodes, a turnover spring which is located between the work member and the movable conductor. In this apparatus, when an impact greater than the predetermined value is applied, the ball is moved on the conical slope and bumps into the work member so as to switch the output electrodes against the power of the turnover spring. As the output electrodes are switched, the impact apparatus outputs an impact signal.

In those apparatus described above, when the power of the fixed electrodes or the turnover spring becomes larger, the apparatus will have higher precision of detection. However, it becomes difficult to switch the output electrodes against the turnover spring by the ball. Therefore, the sensitivity of detection becomes worse.

SUMMARY OF THE INVENTION

Accordingly, it is an object of the present invention to provide an impact detecting apparatus without the foregoing drawbacks.

In accordance with the present invention, an impact detecting apparatus comprises, a housing having a conical slope therein, a ball located on the conical slope, a shaft located within the housing and movably supported on the housing for striking the ball with one end, a fixed electrode located within the housing, a movable electrode located near the fixed electrode, the movable electrode electrically connecting with the fixed electrode, a lever rotatably and slidably supported within the housing, one end of the lever being able to push the movable electrode and the other end of the lever being able to make contact with the shaft, and a spring urging the shaft to connect with the lever for striking the ball.

Other objects and advantages of the invention will become apparent during the following discussion of the accompanying drawings.

BRIEF DESCRIPTION OF THE DRAWING FIGURES

The foregoing and additional features of present invention will become more apparent from the following detailed description of preferred embodiments thereof when considered with reference to the attached drawings, in which:

FIG. 1 is an elevational view of the first embodiment of an impact detecting apparatus in accordance with the prevent invention;

FIGS. 2, 3, and 4 are elevational views showing the operation of the first embodiment of an impact detecting apparatus, in accordance with the present invention;

DETAILED DESCRIPTION OF THE PREFERRED EMBODIMENTS

An impact detecting apparatus in accordance with preferred embodiments of the present invention will be described with reference to the attached drawings.

The impact detecting apparatus is installed in a vehicle so as to detect acceleration in a collision of the vehicle.

Figure 1:
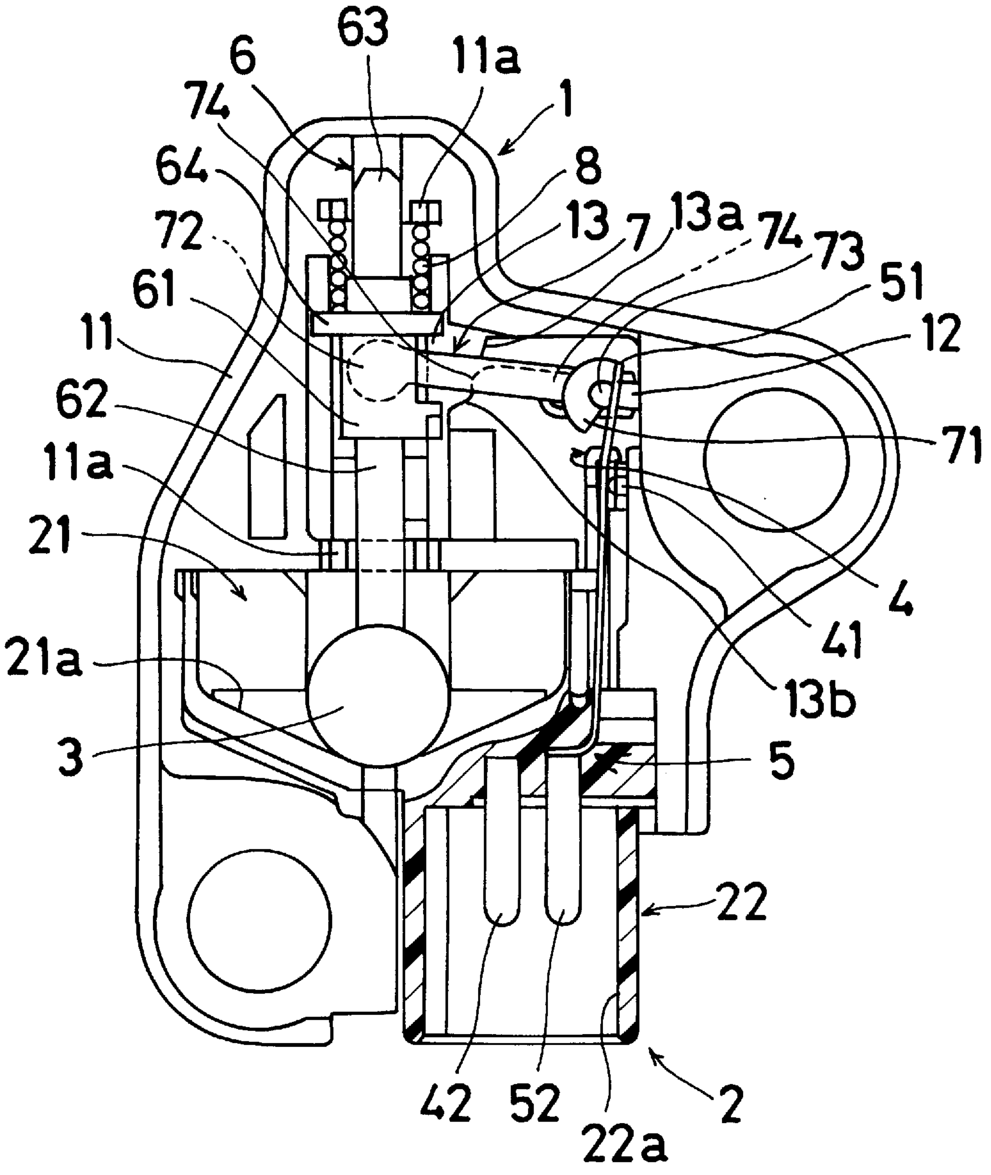

FIGS. 1 through 10 show a first embodiment of the present invention. Referring to FIG. 1, a housing 1 includes a case 11, a cover 16 and a connector member 2. The connector member 2 includes a concavity portion 21 and a connector 22. The bottom of the concavity portion 21 comprises a conical slope 21*a*. The connector 22 has a fixed electrode 4 and a movable electrode 5. The connector 22 is exposed throughout the housing 1.

A ball 3 is disposed within the concavity portion 21 and is able to move on the conical slope 21*a*. The ball 3 is held at the bottom of the conical slope 21*a* by one end of a shaft member 6. The center of the fixed electrode 4 is fixed on the connector 22. One end of the fixed electrode 4 is disposed within the housing 2 and is composed of a contact point 41. The other end of the fixed electrode 4 is disposed within an opening 22*a* of the connector 22 and composes a terminal 42. The center of the movable electrode 5 is also fixed on the connector 22. One end of the movable electrode 5 is disposed within the housing 2 and composes a contact point 51 which is able to contact the contact point 41. The other end of the movable electrode 5 is also disposed within an opening 22*a* of the connector 22 and composes a terminal 52. The contact point 41 and the contact point 51 are located on opposite sides from each other. When a lever member 7 pushes the movable electrode 5, the contact point 51 is able to contact the contact point 41. Then, the electric current flows between the fixed electrode 4 and the movable electrode 5.

Figure 10:
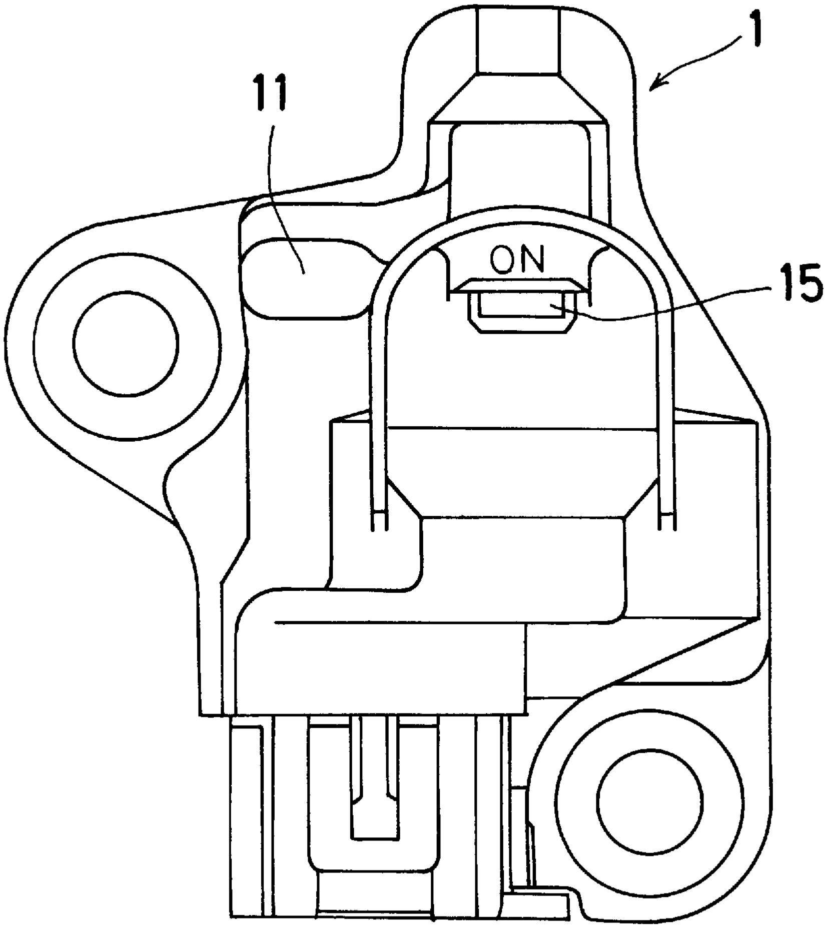
FIG. 10 is an outer end view of the first embodiment of an impact detecting apparatus in accordance with the prevent invention.
Figure 11:
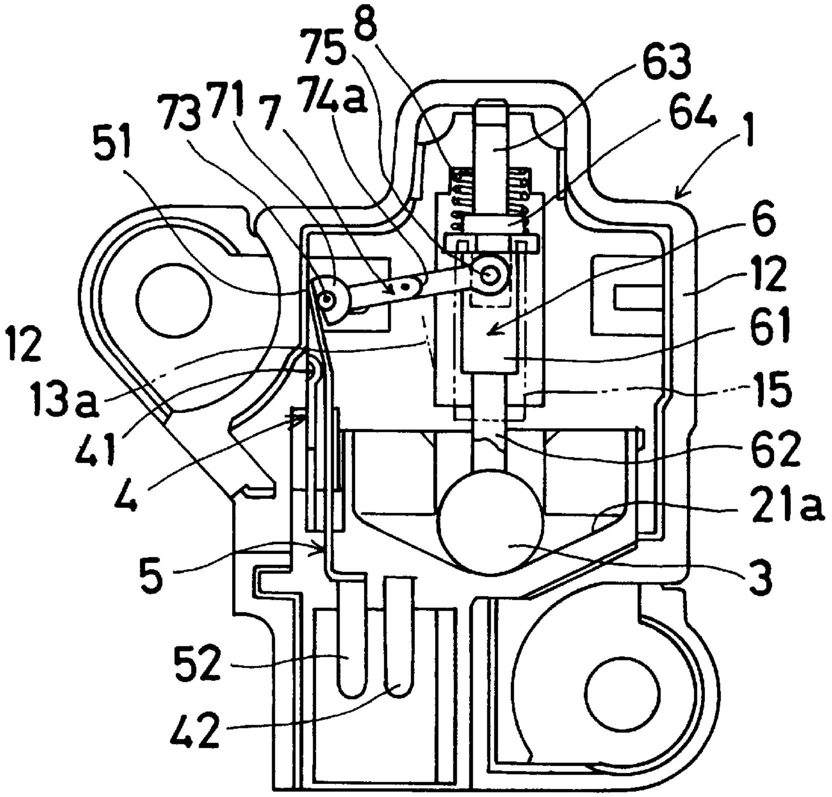
FIG. 11 is an elevational view of the second embodiment of an impact detecting apparatus in accordance with the prevent invention.
Figure 12:
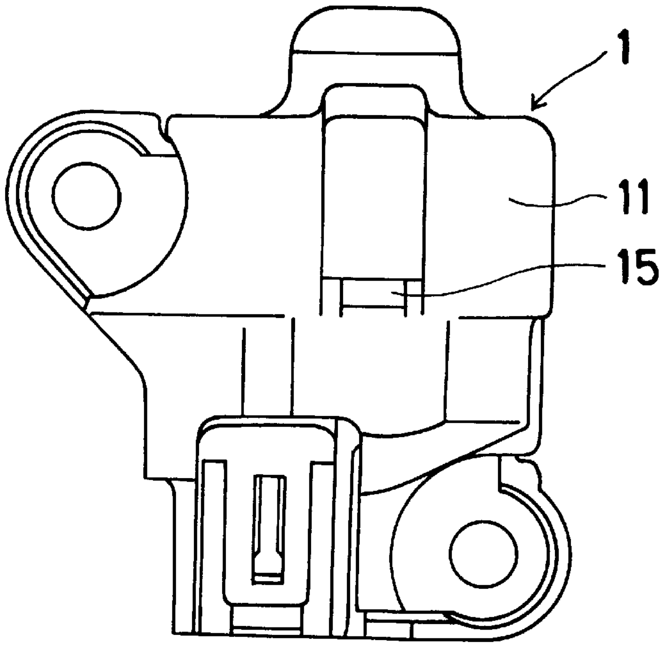
FIG. 12 is an outer end view the second embodiment shown in FIG. 11.
Figure 13:
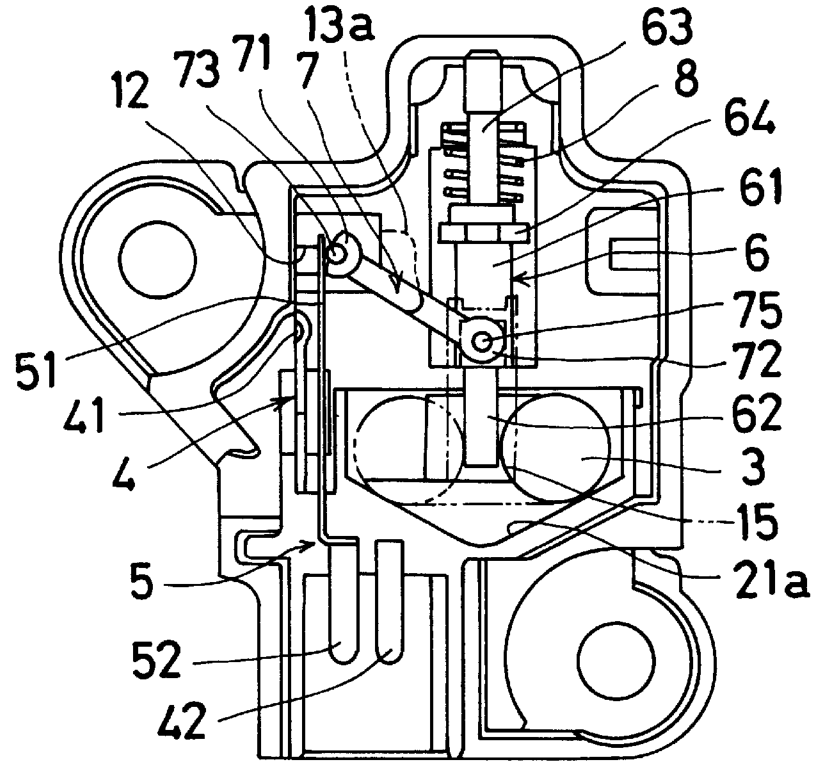
FIG. 13 is an elevational view showing the operation of the second embodiment of an impact detecting apparatus in accordance with the prevent invention.
Figure 14:
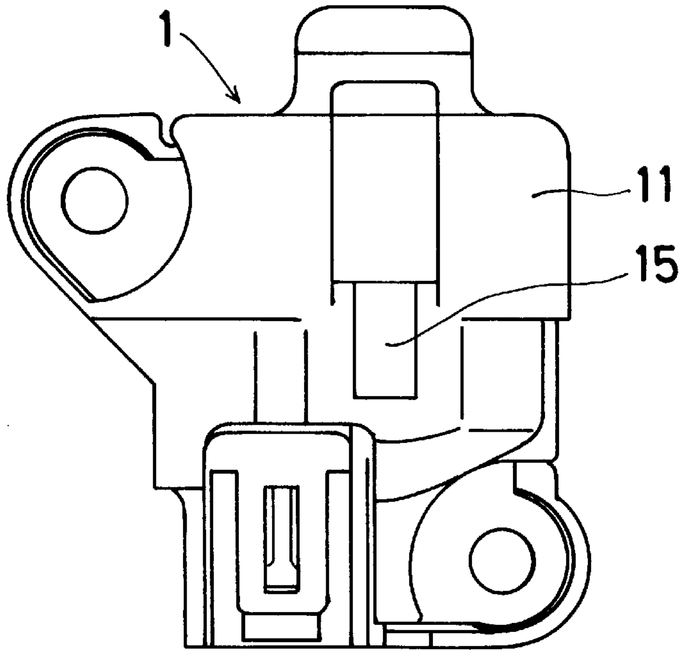
FIG. 14 is an outer end view the second embodiment shown in FIG. 13.

The shaft member 6 is supported by a pair of bearings 11*a* of the case 11 and the cover 16 as shown in FIGS. 1 and 10 and is able to move in the axial direction. The shaft member 6 includes a rectangle portion 61, the first shaft portion 62 which extends to the top of the conical slope 21*a* of the concavity portion 21 of the connector member 2, the second shaft portion 63 which extends in the opposite direction of the first shaft portion 62, and a flange 64 which is located between the rectangle portion 61 and the second shaft portion 63. The shaft member 6 is positionable within the case 11 such that the end of the rectangle portion 61 is able to contact the surface of the ball 3 when moved by operation of the lever member 7 see FIG. 4). A coil spring 8 is located around the second shaft portion 63. One end of the coil spring 8 is supported by the bearing 11*a,* the other end of the coil spring 8 is supported by the flange 64. Therefore, the shaft member 6 is always pushed toward the top of the conical slope 21*a* of the concavity portion 21 by the spring 8.

The lever member 7 includes a pushing portion 71 which is located at one end of the lever member 7 and which pushes the contact point 51 of the movable electrode 5, a connecting portion 72 which is slipped down along the rectangle portion 61 of the shaft member 6 by the flange 64 of the shaft member 6, a pair of spindle portions 73 which are located on the pushing portion 71 and which extend perpendicular to the length direction of the lever member 7 and, a long and narrow projection 74 which is located on the side of the surface of the lever member 7 along the lever member 7. The one end of the projection 74, near the connection portion 72, is tapered off to a point 74*a.*

The case 11 has a slit 12. The slit 12 is accepted in one of the spindle portions 73. The slit 12 extends along the direction of the contact point 51 of the movable electrode 5. The cover 16 has a similar slit (not shown). Therefore, the lever member 7 is able to slide along the slit 12, and is able to rotate around the spindle portions 73.

Figure 5:
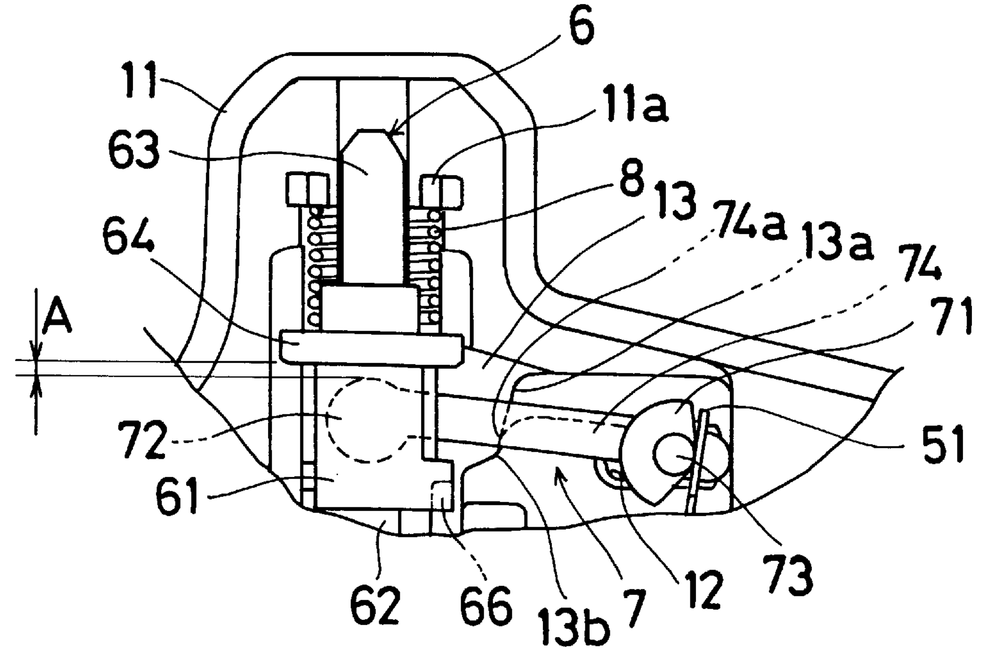
FIG. 5 is a partially enlarged diagrammatic view, of a portion of the arm shown in FIG. 1.

As shown in FIGS. 1 and 5, the case 11 of the housing 1 has a projected wall 13. The projected wall 13 is opposed to the projection 74 of the lever member 7. The projected wall 13 includes a contact surface 13*a* which is almost a straight surface so as to contact the contact surface 74*a* of the projection 74. The contact surface 13*a* constitutes a part of the locus of the lever member 7. The contact surface 74*a* of the lever member 7 contacts with the contact surface 13*a* of the project wall 13 so as to push the coanecting portion 72 of the lever member 7 and the contact point 51 of the movable electrode 5 to the contact point 41 of the fixed electrode 4. The lever member 7 is controlled to slide by the repulsive force of the movable electrode 5. On the other hand, one end of the contact surface 13*a* has a small knoll 13*b*. When the contact surface 74*a* runs up onto the small knoll 13*b,* the resistance force increases such that the resistance force resists rotation of the lever member 7. The resistance force is less than the force of the coil spring 8.

The operation of the impact detecting apparatus having the above structure will now be described.

Referring to FIGS. 1 and 5, the impact detecting apparatus is in the first stage which is awaiting some impact. As the first stage, the ball 3 is located on the bottom of the conical slope 21*a* of the concavity portion 21. The tip of the first shaft portion 62 of the shaft member 6 pushes on the surface of the ball 3. The contact surface 74*a* of the projection 74 of the lever 7 is in contact with the contact surface 13*a* of the projected wall 13 at the foot of the small knoll 13*b*. Therefore, the contact between the above contact surfaces 13*a* and 74*a* resists sliding the lever member 7. At this time, the pushing portion 71 of the lever member 7 pushes the contact point 51 of the movable electrode 5 so as to turn on the electricity between the contact point 51 of the movable electrode 5 and the contact point 41 of the fixed electrode 4. The above arrangement between the shaft member 6 and the lever member 7 makes a clearance A as shown in FIG. 5. Therefore, the resistance force from the flexure of the movable electrode 5 is not transmitted to the shaft member 6 through the lever member 7.

Figure 2:
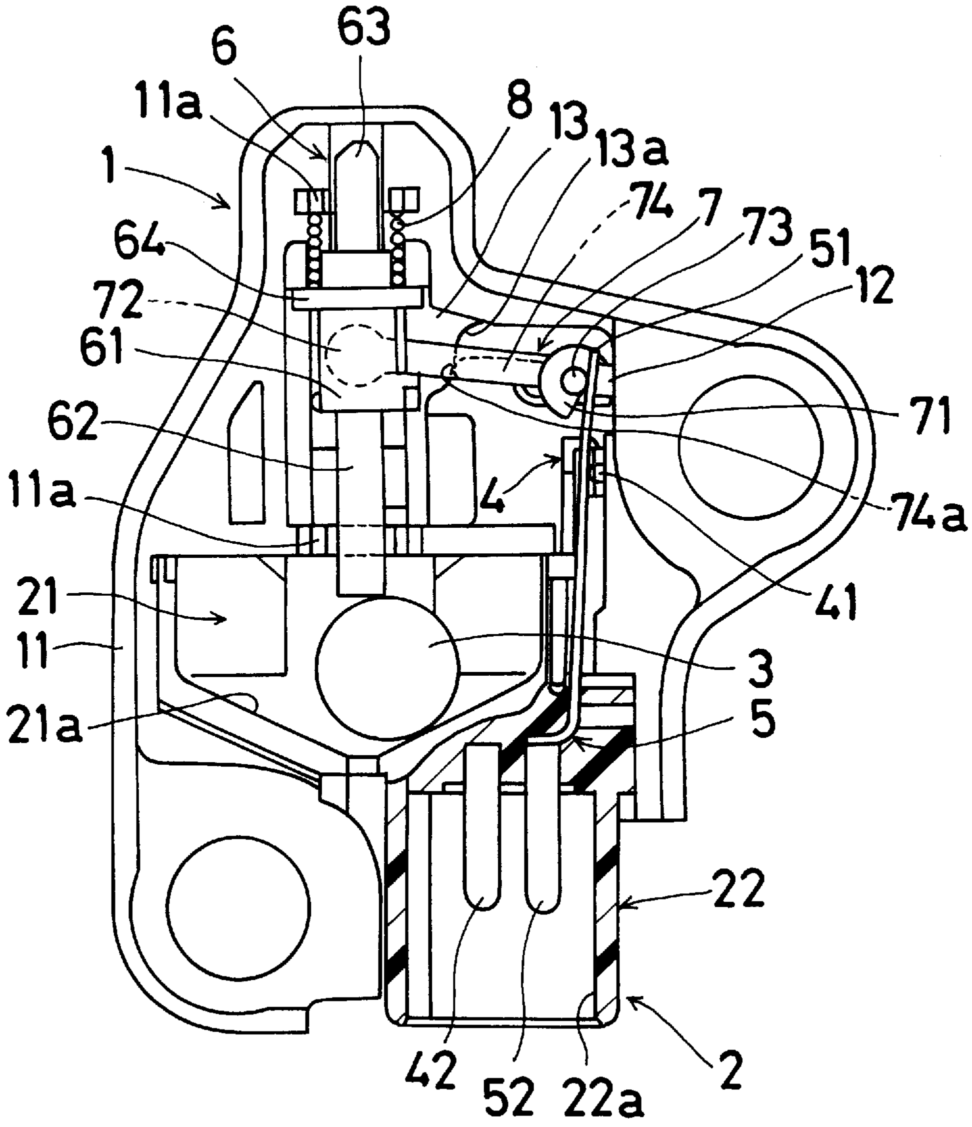
Figure 3:
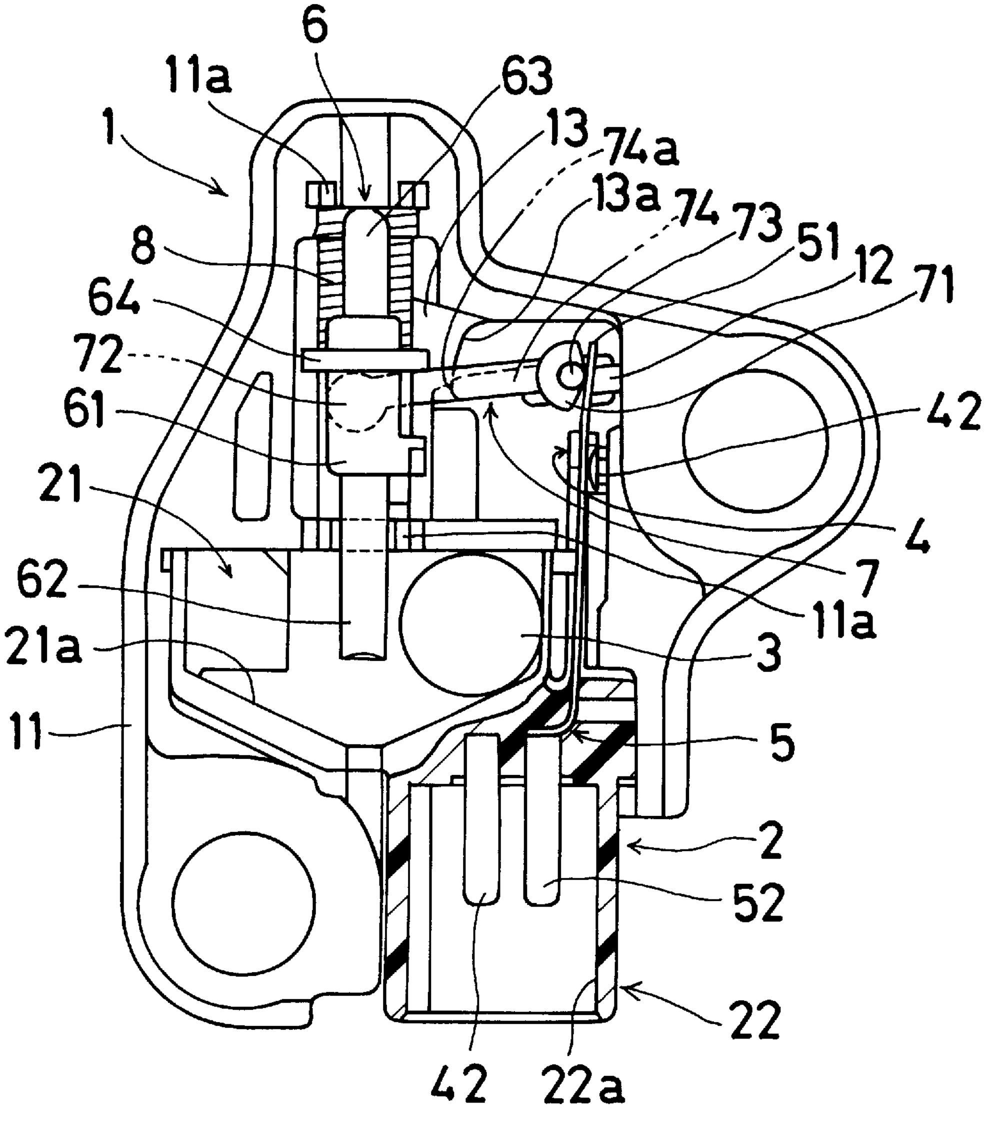
Figure 6:
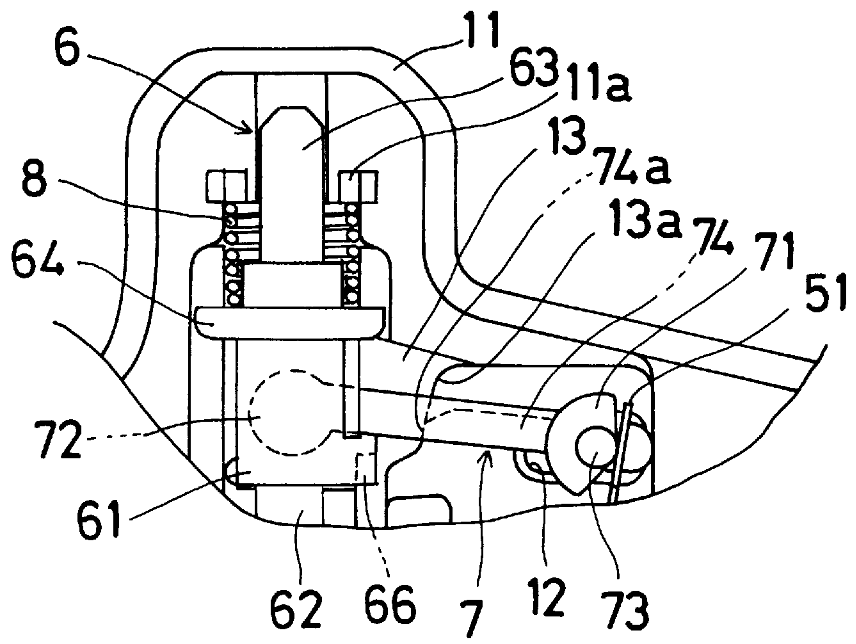
FIG. 6 is a partially enlarged diagrammatic view, of a portion of the arm shown in FIG. 2.
Figure 7:
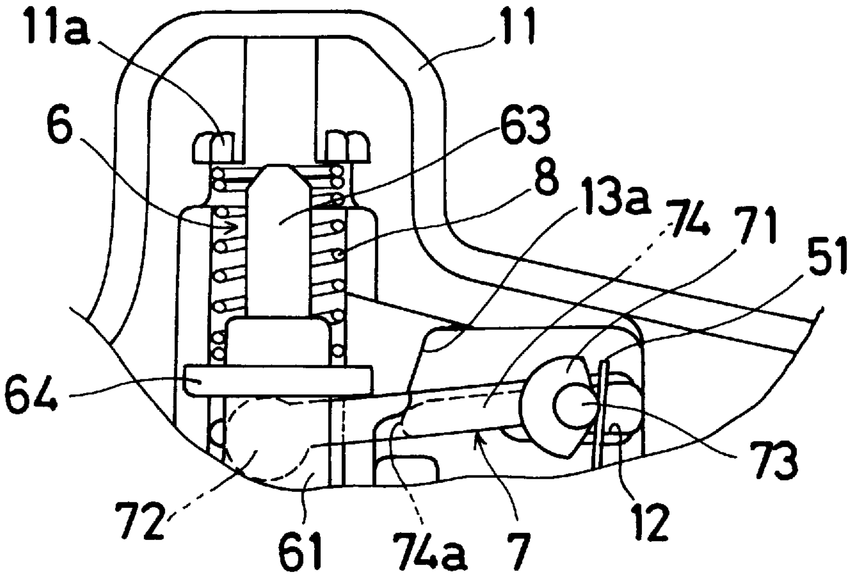
FIG. 7 is a partially enlarged diagrammatic view, of a portion of the arm shown in FIG. 3.

On the above stage, when an impact greater than the predetermined value is applied, the tip of the first portion 62 of the shaft member 6 comes out from the surface of the ball 3 and the ball 3 is moved on the conical slope 21. When the tip of the first portion 62 of the shaft member 6 comes out from the surface of the ball 3, the ball 3 lifts the shaft member 6 against the coil spring 8 as shown in FIGS. 2 and 6. After then, the coil spring 8 moves the shaft member 6 downwardly, as shown in FIGS. 3 and 7. Therefore, the flange 64 of the shaft member 6 contacts the connecting portion 72 of the lever member 7, and rotates the lever member 7. As the lever 7 roates, the contact surface 74*a* of the projection 74 of the lever member 7 is released from the contact surface 13*a* of the projected wall 13 and the resistance force from the flexure of the movable electrode 5 makes the lever member 7 slide along with the slits 12 in the leftwardly direction in FIG. 3. Therefore, the pushing portion 71 of the lever 7 releases the contact point 51 of the movable electrode 5. As a result, the electric current is cut off between the fixed electrode 4 and the movable electrode 5, and the impact detecting apparatus outputs an impact signal.

On the first stage as shown in FIG. 1, the resistance force from the flexure of the movable electrode 5 is received by the lever member 7. There is a clearance A between the shaft member 6 and the lever member 7 as shown in FIG. 5.

Therefore, the resistance force from the flexure of the movable electrode 5 does not act on the shaft member 6. As the result, even if the resistance force from the flexure of the movable electrode 5 becomes larger to make the switching performance more sensitive between the fixed electrode 4 and the movable electrode 5, the power of pushing the ball 3 by the coil spring 8 is not influenced. Namely, the resistance force from the flexure of the movable electrode 5 does not act on the sensitivity of detecting impact of the above embodiment.

Figure 4:
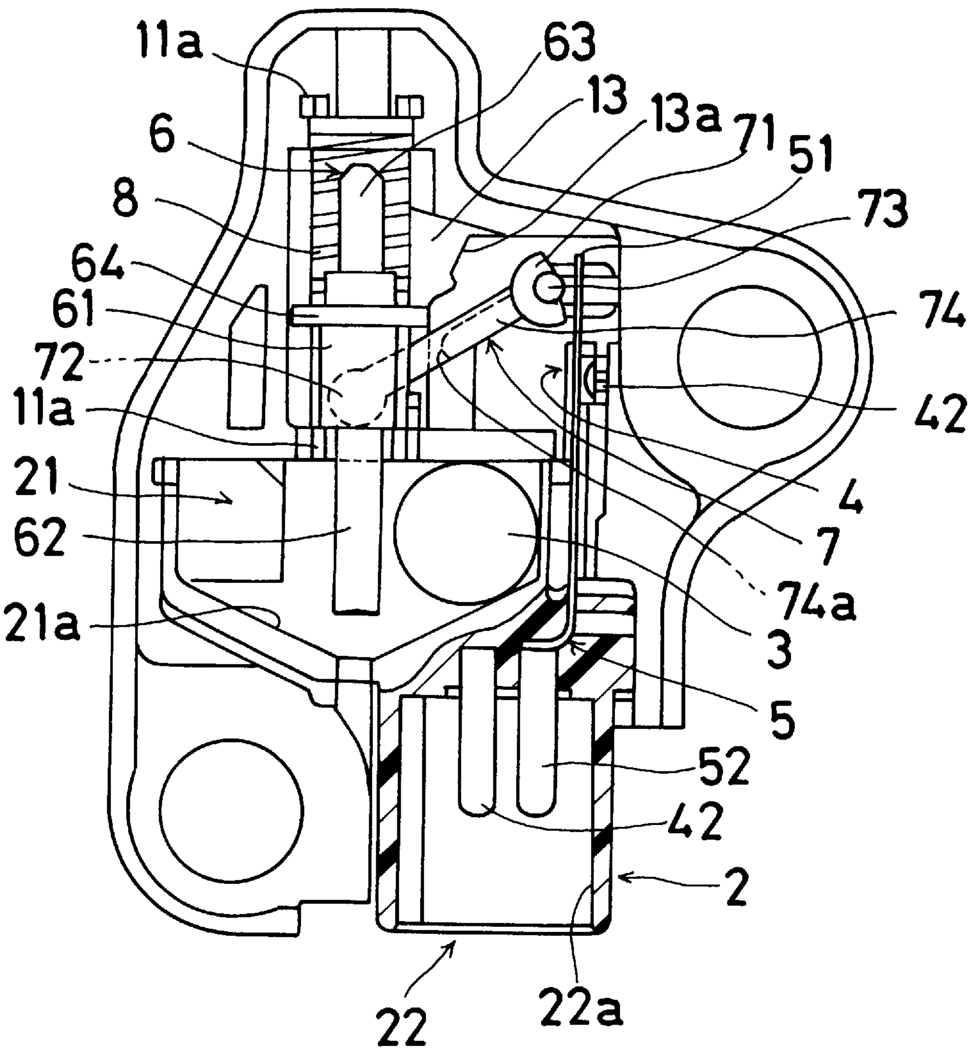
Figure 8:
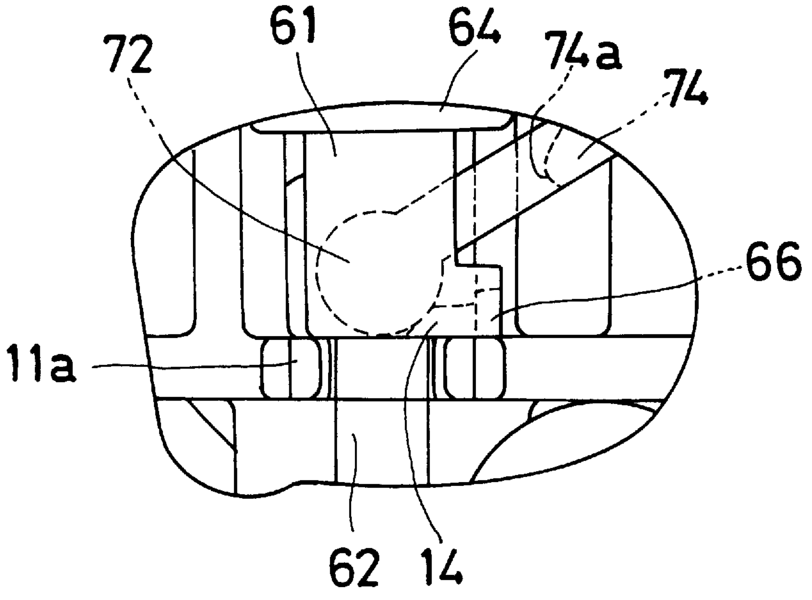
FIG. 8 is a partially enlarged diagrammatic view, of a portion of the arm shown in FIG. 4.

Referring to FIG. 8, the case 11 of the housing 1 includes a guide wall 14 which is able to contact the connecting portion 72 of the lever member 7. The guide wall 14 contacts the connecting portion 72 on the condition as shown in FIG. 4 so as to guide the lever member 7 to slide by compulsion.

Figure 9:
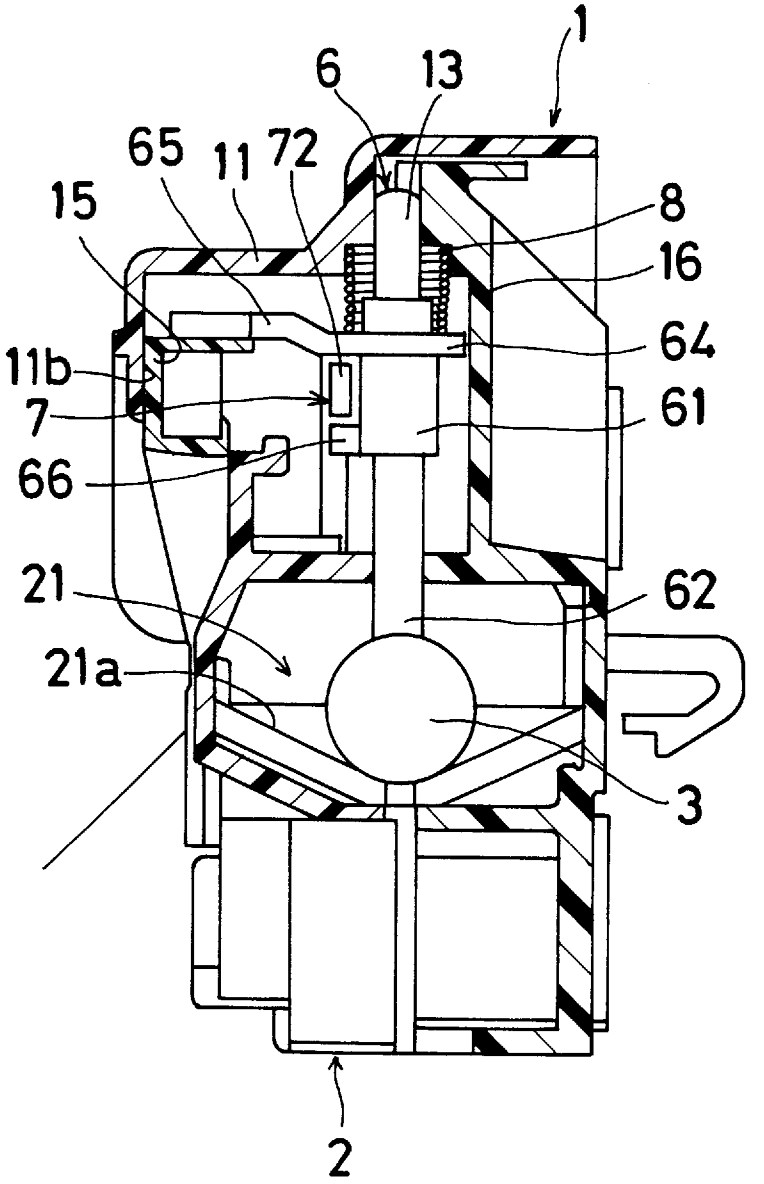
FIG. 9 is a sectional view of the first embodiment of an impact detecting apparatus in accordance with the prevent invention.

Referring to FIGS. 9 and 10, the flange 64 of the shaft member 6 includes an arm portion 65 which extends to the case 11. The tip of the arm portion 65 is attached to an indicator 15. The case 11 has an accepted concavity portion 11*b* which accepts the indicator 15. The indicator 15 is accepted in the accepted concavity portion 11*b* on the condition shown in FIG. 1, and is stepped forward from the accepted concavity portion 11*b* on the condition shown in FIG. 4. As a result, the condition of the impact detecting apparatus is recognized.

In addition, referring to FIG. 9, the rectangle portion 61 of the shaft member 6 includes a projection 66. The projection 66 is able to contact the under side of the connecting portion 72 of the lever member 7. Therefore, if the indicator 15 is lifted to the accepted concavity portion 11*b* on the condition shown in FIG. 4, both the shaft member 6 and the lever member 7 are lifted. Therefore, it is easy to return to the condition shown in FIG. 1.

FIGS. 11 to 14 illustrate another modified version of the first preferred embodiment, which specifically is a modified arrangement of indicator 15. In FIGS. 11 through 14, the same parts in FIGS. 1 through 10 are used with the same numerals of FIGS. 1 through 10. In this modified construction, the connecting portion 72 of the lever member 7 includes a spindle portion 75 which extends to the case 11 of the housing 1. The indicator 15 which is accepted in the accepted concavity portion 11*b* is connected with the spindle portion 75 of the lever 7 and the lever 7 in one body. Therefore, if the indicator 15 is extended out of the accepted concavity portion 11*b* as a result of the condition shown in FIG. 13, both the shaft member 6 and the lever member 7 are also extended. Therefore, it is easy to return to the condition shown in FIG. 11.

Figure 15:
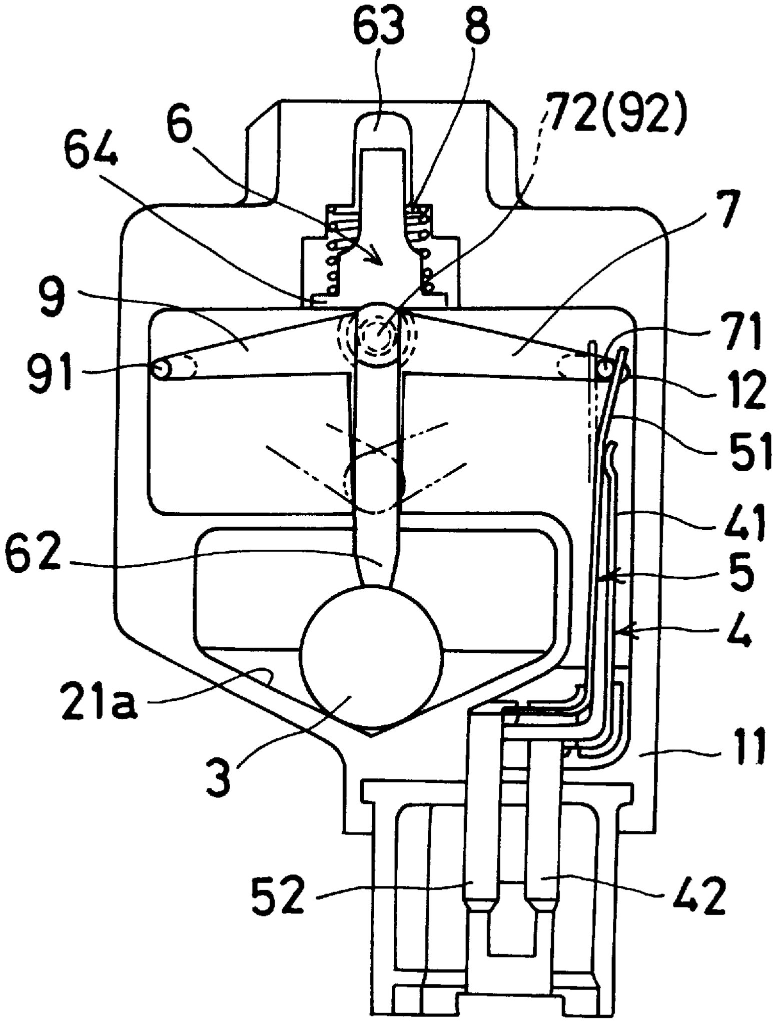
FIG. 15 is an elevational view of the third embodiment of an impact detecting apparatus in accordance with the prevent invention.

FIG. 15 illustrates another modified version of the first preferred embodiment, which specifically has a modified arrangement of the lever member 7. In FIG. 15, the same parts in FIG. 1 is used with the same numerals of FIG. 1. As shown in FIG. 15, the pushing portion 71 of the lever member 7 pushes to the contact point 51 of the movable electrode 5. The connecting portion 72 of the lever member 7 is able to connect with the flange 64 of the shaft member 6. In addition, one end 91 of a spare lever member 9 pushes the inside wall of the case 11 and the other end 92 is contacted with the connecting portion 72 of the lever member 7. Both of the lever member 7 and the spare lever member 9 are able to rotate. Therefore, the contact between the inside wall of the case 11 and the end 91 of the spare lever member 9 is guided by the slit 12 of the lever member 7. In other words, the contact between the end 91 of the spare lever member 9 and the inside wall of the case 11 is substituted with the contact between the projected wall 13 and the projection 74 of the first and second embodiment.

What is claimed is:

1. An impact detecting apparatus comprising:

a housing having a conical slope therein;

a ball located on the conical slope;

a shaft located within the housing and movably supported in the housing for striking the ball with one end;

a fixed electrode located within the housing;

a movable electrode located near the fixed electrode, the movable electrode electrically connecting with the fixed electrode;

a lever rotatably and slidably supported within the housing, one end of the lever being able to push the movable electrode and the other end of the lever being able to contact the shaft; and a spring urging the shaft for striking the ball.

2. An impact detecting apparatus in claim 1, wherein the lever includes an engage portion engaging with the housing so as to restrict the lever from sliding.

3. An impact detecting apparatus in claim 2, wherein the housing includes an engage portion engaging with the engage portion of the lever.

4. An impact detecting apparatus in claim 1, wherein a clearance is provided along the contact direction between the end of the lever and the shaft when the shaft strikes the ball with the one end of the shaft.

5. An impact detecting apparatus in claim 1, wherein the housing includes a guide wall so as to slide the lever for releasing the one end of the lever from contact with the movable electrode.

6. An impact detecting apparatus in claim 1, further comprising a supplementary lever located within the housing, one end of the supplementary lever rotatably supported and the other end of the supplementary lever being able to make contact with the shaft in collaboration with the lever.

* * * * *